(12) United States Patent
Sulavik et al.

(10) Patent No.: US 10,108,909 B2
(45) Date of Patent: Oct. 23, 2018

(54) SYSTEM FOR AUTHENTICATION AND TRACKING OF EVENT TICKETS

(71) Applicants: Stephen Sulavik, Astoria, NY (US); Julie Yee, Brooklyn, NY (US); Jeanetta Skorzewski, Bellerose, NY (US)

(72) Inventors: Stephen Sulavik, Astoria, NY (US); Julie Yee, Brooklyn, NY (US); Jeanetta Skorzewski, Bellerose, NY (US)

(73) Assignee: Metropolitan Life Insurance Co., New York, NY (US)

(*) Notice: Subject to any disclaimer, the term of this patent is extended or adjusted under 35 U.S.C. 154(b) by 95 days.

(21) Appl. No.: 13/939,865

(22) Filed: Jul. 11, 2013

(65) Prior Publication Data

US 2015/0014412 A1    Jan. 15, 2015

(51) Int. Cl.
| | |
|---|---|
| *G06Q 10/02* | (2012.01) |
| *H04L 9/32* | (2006.01) |
| *H04W 12/06* | (2009.01) |
| *G06Q 20/04* | (2012.01) |
| *G06F 21/33* | (2013.01) |
| *H04L 29/06* | (2006.01) |
| *H04W 4/021* | (2018.01) |

(52) U.S. Cl.
CPC ............ *G06Q 10/02* (2013.01); *G06F 21/33* (2013.01); *G06Q 10/025* (2013.01); *G06Q 20/0457* (2013.01); *H04L 9/3226* (2013.01); *H04W 12/06* (2013.01); *H04L 29/06761* (2013.01); *H04L 63/0861* (2013.01); *H04L 2209/805* (2013.01); *H04W 4/021* (2013.01)

(58) Field of Classification Search
CPC .. G07C 9/00103; G07C 9/02; G06Q 30/0601; G06Q 30/0641; G06Q 30/06; G06Q 10/025; G06Q 10/02; G06Q 20/0457; G06F 21/33; H04W 12/06
USPC .......................................... 235/382; 705/26.1
See application file for complete search history.

(56) References Cited

U.S. PATENT DOCUMENTS

| | | | | |
|---|---|---|---|---|
| 5,948,040 | A * | 9/1999 | DeLorme ............... | G01C 21/36 340/990 |
| 6,223,166 | B1 * | 4/2001 | Kay ................................. | 705/5 |
| 6,289,378 | B1 * | 9/2001 | Meyer ..................... | G06F 21/31 709/202 |
| 6,736,322 | B2 * | 5/2004 | Gobburu et al. ........ | 235/462.46 |
| 7,278,023 | B1 * | 10/2007 | Siegel ..................... | G06F 21/31 380/30 |
| 9,690,968 | B2 * | 6/2017 | Wadley ................ | G06K 7/1417 |

(Continued)

*Primary Examiner* — Daniel Walsh
(74) *Attorney, Agent, or Firm* — Troutman Sanders LLP

(57) ABSTRACT

The invention provides a system for verification of tickets issued for receipt of goods and/or services, which system comprises: one or more tickets, one or more ticket identification codes corresponding to each ticket, wherein each ticket identification code is unique to each ticket, a database server storing the ticket identification codes, and a mobile device, wherein the mobile device is in communication with the database server and is capable of reading the ticket identification codes. The system provides event staff with a reliable and efficient system for verifying the authenticity and tracking redemption of issued tickets. The system also provides event staff with stored customer data upon scanning a ticket.

7 Claims, 2 Drawing Sheets

(56) References Cited

U.S. PATENT DOCUMENTS

| | | | |
|---|---|---|---|
| 2002/0023027 A1* | 2/2002 | Simonds | 705/26 |
| 2002/0116343 A1* | 8/2002 | Nakamura | G06Q 10/02 705/65 |
| 2002/0169623 A1* | 11/2002 | Call | G06Q 10/02 705/5 |
| 2002/0188557 A1* | 12/2002 | Ochiai | G06Q 40/025 705/38 |
| 2003/0069764 A1* | 4/2003 | Gathman | G06Q 10/02 705/5 |
| 2003/0105954 A1* | 6/2003 | Immonen | G06Q 20/04 713/156 |
| 2003/0164400 A1* | 9/2003 | Boyd | 235/382 |
| 2003/0228898 A1* | 12/2003 | Rowe | G07C 9/00158 463/25 |
| 2004/0073439 A1* | 4/2004 | Shuster | G07C 9/00079 705/5 |
| 2004/0256455 A1* | 12/2004 | Fukushima et al. | 235/382 |
| 2005/0193182 A1* | 9/2005 | Anderson | G06F 21/80 711/163 |
| 2006/0081704 A1* | 4/2006 | Boyd | 235/382 |
| 2006/0208892 A1* | 9/2006 | Ehrman et al. | 340/572.1 |
| 2007/0158402 A1* | 7/2007 | Sonetaka | 235/375 |
| 2007/0276944 A1* | 11/2007 | Samovar | G07C 9/00103 709/225 |
| 2008/0154623 A1* | 6/2008 | Derker | G06Q 10/087 705/1.1 |
| 2008/0223940 A1* | 9/2008 | Lee | G06Q 10/02 235/494 |
| 2009/0032587 A1* | 2/2009 | Takanashi | G06F 21/32 235/382 |
| 2009/0247125 A1* | 10/2009 | Grant | H04M 1/7253 455/411 |
| 2010/0082491 A1* | 4/2010 | Rosenblatt et al. | 705/65 |
| 2010/0113072 A1* | 5/2010 | Gibson | G06Q 20/045 455/466 |
| 2010/0131366 A1* | 5/2010 | Gibson | G06Q 30/02 705/14.58 |
| 2010/0133339 A1* | 6/2010 | Gibson | G06Q 10/02 235/382 |
| 2010/0219234 A1* | 9/2010 | Forbes | G06Q 10/02 235/375 |
| 2011/0087888 A1* | 4/2011 | Rennie | G06F 21/41 713/182 |
| 2011/0093820 A1* | 4/2011 | Zhang | A63F 13/06 715/863 |
| 2011/0133892 A1* | 6/2011 | Nohr | 340/10.1 |
| 2012/0091202 A1* | 4/2012 | Cohen et al. | 235/382 |
| 2012/0185394 A1* | 7/2012 | Gelfand | G06Q 10/02 705/44 |
| 2013/0066690 A1* | 3/2013 | Echanove Hernandez | G07B 15/04 705/13 |
| 2013/0124236 A1* | 5/2013 | Chen | G06Q 20/045 705/5 |
| 2013/0313314 A1* | 11/2013 | Jeng | G06K 5/00 235/375 |
| 2013/0325523 A1* | 12/2013 | Huang | G06Q 10/02 705/5 |
| 2014/0095226 A1* | 4/2014 | Kourkoumelis | G06Q 10/02 705/5 |
| 2014/0279615 A1* | 9/2014 | Levin | G06Q 30/0185 705/318 |
| 2015/0014412 A1* | 1/2015 | Sulavik | G06Q 10/02 235/380 |
| 2015/0051925 A1* | 2/2015 | Yudin | G06Q 10/02 705/5 |
| 2015/0052598 A1* | 2/2015 | Sarbaev | G06Q 10/02 726/10 |
| 2015/0053757 A1* | 2/2015 | Williams | G06K 7/10009 235/375 |
| 2015/0081346 A1* | 3/2015 | Charles | G06Q 10/02 705/5 |
| 2015/0213660 A1* | 7/2015 | Bergdale | G07C 9/00119 340/5.61 |
| 2015/0294515 A1* | 10/2015 | Bergdale | G06Q 20/045 340/5.61 |
| 2016/0005012 A1* | 1/2016 | Goetz | G06Q 20/123 705/5 |
| 2016/0036588 A1* | 2/2016 | Thackston | H04L 9/321 713/168 |
| 2016/0364590 A1* | 12/2016 | Wadley | G07C 9/00103 |
| 2017/0293908 A1* | 10/2017 | Wadley | G06Q 20/208 |
| 2018/0018597 A1* | 1/2018 | Siegel | G06Q 10/02 |

\* cited by examiner

SYSTEM FOR AUTHENTICATION AND TRACKING OF EVENT TICKETS

TECHNICAL FIELD

This invention relates generally to entry ticket authentication and check-in systems.

BACKGROUND

Checking in guests on-site for an event is most often accomplished by event staff manually. When presented with a ticket or other authorization device for entry, an entry or gate agent must independently authenticate the validity of the presented ticket by looking for unique, physical cues on the ticket that self-authenticate its validity (e.g. watermarks, holograms, etc.), and/or search for the ticket presenter's name in a list of authorized guest names. The agent then checks in the guest-updating and editing the guest list in paper copy or an Excel or other database spreadsheet by hand or editing the information on a computer.

The manual check-in process is time consuming because it requires the agent to carefully inspect each ticket to verify its authenticity and/or look through a list of guest names. As the event size grows, the list of names grows and, along with it, the time required to search through the list.

Manual check-in is also inefficient and unreliable because agents must be trained on visual inspection techniques, and even with proper training, there is a significant risk of human error in visual authentication. Furthermore, physical authentication cues on tickets can often be forged or duplicated. Adding forgery resistant technology, such as holograms, may reduce forgery, but introduces additional costs to the production of each ticket.

Manual check-in also presents difficulties in accurately tracking ticket utilization across multiple entry agents. Manually updating the list of authorized names with guests who have already checked in creates additional risk of human error.

SUMMARY AND OBJECTS OF THE INVENTION

It is an object of this invention to provide a reliable and efficient system for verifying the authenticity of tickets issued for receipt of goods and/or services.

It is another object of this invention to provide a reliable system for checking in guests to an event and/or identifying a ticket as presented to prevent others from presenting the same ticket.

It is yet another object of this invention to provide event staff stored guest data for further verification of identity and/or improved customer service.

These and other objects, as will be apparent from the following description, are met by the present invention.

In one illustration, the invention provides a system for verification of tickets issued for receipt of goods and/or services, which system comprises: one or more tickets, one or more ticket identification codes corresponding to each ticket, wherein each ticket identification code is unique to each ticket, a database server storing the ticket identification codes, and a mobile device, wherein the mobile device is in communication with the database server and is capable of reading the ticket identification codes.

Another illustration of the invention provides the use of a mobile device programmed to display the status and/or guest data corresponding to a ticket after its ticket identification code is read by the mobile device. The status of the ticket may be displayed as invalid if the ticket identification code is not recognized as a valid, unredeemed ticket identification code.

Another illustration of the invention provides the use of a mobile device programmed to enter changes to the status and/or guest data corresponding to a ticket.

FIGURES OF DRAWINGS

DETAILED DESCRIPTION

Figure 1:
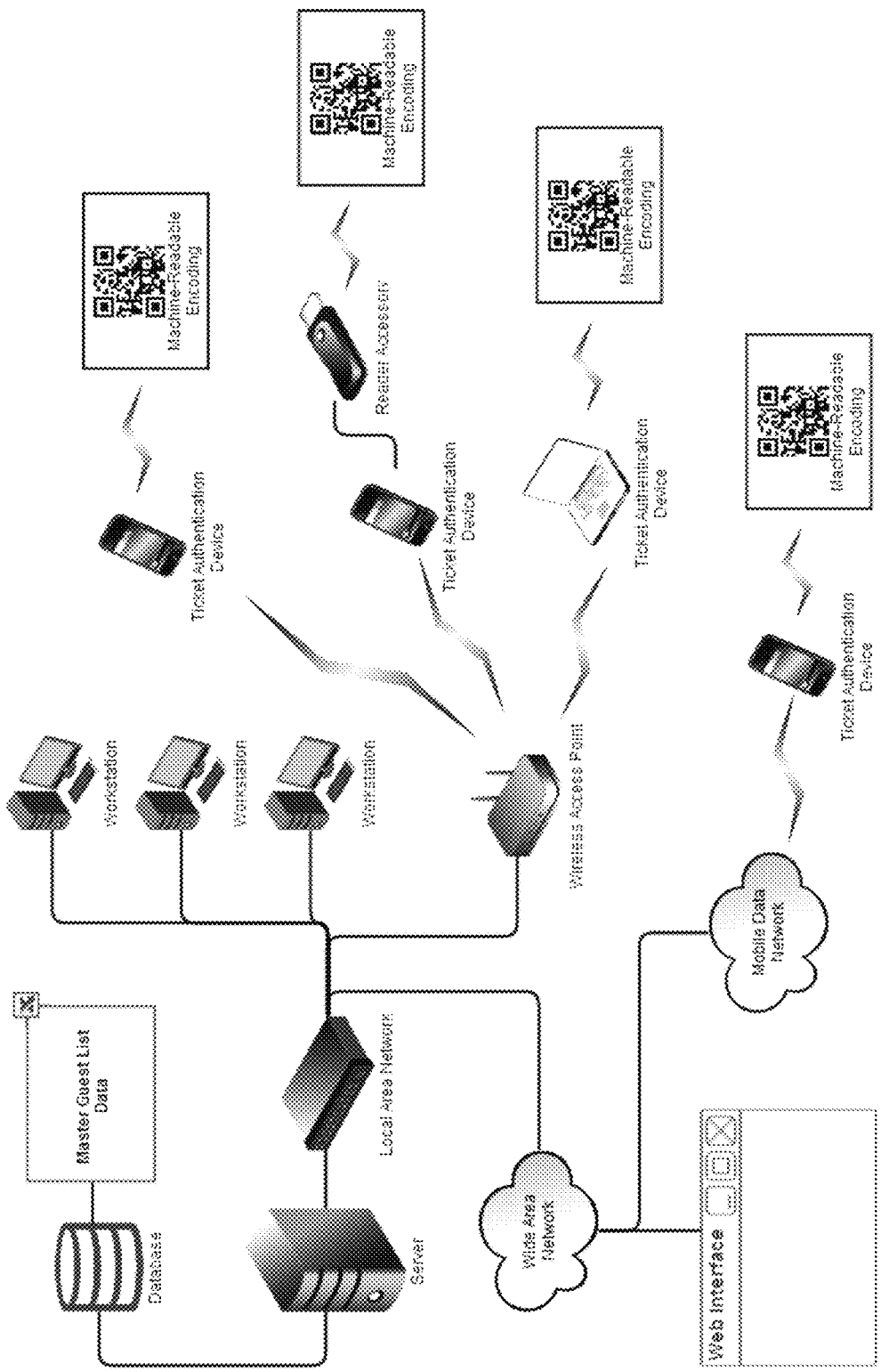
FIG. 1 is a hardware flow chart for a representative embodiment of the invention.
Figure 2:
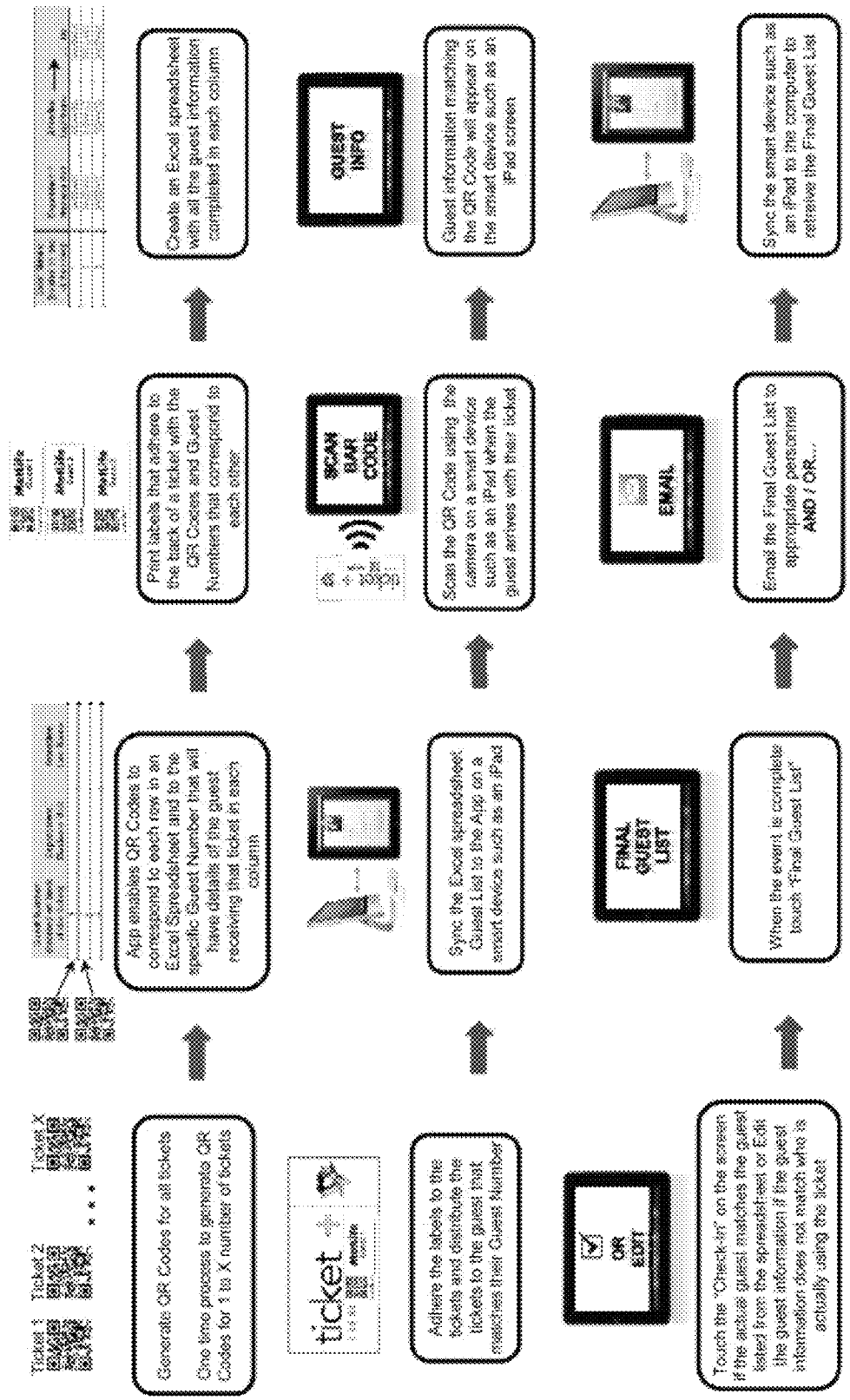
FIG. 2 is a general operational flow chart for one embodiment of the invention.

An automated ticket verification system that utilizes mobile devices to authenticate tickets provides an efficient and accurate method to check-in guests on-site.

Ticketing

Tickets may be issued to be later redeemed for a variety of goods and/or services. By way of non-limiting example, tickets may be offered to be redeemed to gain entry into controlled-access locations, such as sports stadiums, museums, buildings, landmarks, parks; or performances and events, such as concerts, music performances, sports events, museum exhibits, theatrical shows, art galleries, movie theaters. By way of further, non-limiting example, tickets may be offered to be redeemed in exchange for the ownership, use or possession of goods, such as food or drink vouchers, motor vehicle rentals, or bicycle rentals. By way of further, non-limiting example, tickets may be offered to be redeemed in exchange for services, such as transportation services, amusement park rides, spa services, guided tours, cleaning services, physical training, music lessons. For the sake of simplicity in description, any goods or services the enjoyment of which are controlled by issuance of a finite number of tickets to be redeemed in exchange for said enjoyment is referred to herein as an "event."

Issued tickets are each assigned a unique ticket identification code that corresponds to a specific ticket. Alternatively, a ticket identification code or a portion thereof, may be assigned to a group comprised of more than one ticket.

Each ticket identification code is stored in a master ticket database. The master ticket database may also store various data associated with the purchaser of each ticket ("purchaser") and/or the intended user of each ticket ("guest"). The purchaser and the guest is typically, but not necessarily, the same individual. For example, an individual may be the purchaser of a ticket to be redeemed by the original purchaser, or may transfer the purchased ticket to another individual to be redeemed. A single ticket may also be associated with more than one purchaser and/or guest. For example, a single ticket may permit entry to an event by the purchaser/guest and a companion guest.

The stored data associated with each ticket may include personal information of purchasers and/or guests such as name, address, employer, office location, department, title, facial photo, employee identification number, driver's license image, driver's license issuing state, driver's license number, credit card number, credit card security code, security clearance, fingerprint data and/or mobile device Media Access Control (MAC) address, Near Field Communication (NFC) identification data and/or International Mobile Station Equipment Identity (IMEI) number. The stored data associated with each ticket may also include information related to the ticket in addition to the ticket identification code, such as ticket identification code encoding method or methods, ticket identification code encoding security keys, ticket number (if different from the ticket identification code), purchase price, purchase method, redemption value, redemption status, redemption count, redemption date, redeeming agent name, redeeming device identification, seat location and seating category.

If a ticket identification code or a portion thereof is associated with a group of more than one ticket, the number of redemptions available in the group can be set and stored in the master ticket database.

The data stored in the master ticket database may be exported at any time to provide information on ticket issuance and redemption. This information would be useful to organizations purchasing and redeeming groups of tickets for accounting and tax purposes.

Each guest may be assigned a unique guest identification code in the form of alphanumeric characters of sufficient length to uniquely identify each guest. The guest identification code associated with the guest for each ticket may also be stored in the master ticket database.

The ticket identification code may be in the form of alphanumeric characters of sufficient length to uniquely identify each ticket. The ticket identification code may be further encoded into a machine-readable format capable of storing the amount of data sufficient to store the ticket identification code, such as a linear or matrix barcode, radio frequency identification (RFID) chip, holographic image, or magnetic strip. The matrix barcode may be any available matrix coding technology that is capable of storing the amount of data sufficient to store the ticket identification code, such as QR Code, DataGlyphs, Data Matrix, Aztec Code, EZcode, High Capacity Color Barcode, MaxiCode or ShotCode. Multiple methods of encoding the ticket identification code may be utilized to provide redundancy and further security. In the case of visually encoded ticket identification codes, the visual encoding may also be stored in the master ticket database.

The tickets may be issued to the purchaser or guest with the corresponding ticket identification code and/or machine-readable encoding printed or installed directly on the ticket. The ticket identification code and/or the machine-readable encoding may also or alternatively be printed or installed on labels or tags that are affixed to the corresponding tickets. The labels or tags may further be printed with the guest name and/or guest identification code.

Alternatively or in addition to paper ticketing, the tickets may be issued electronically to the purchaser or guest through electronic mail or messaging, mobile application or other suitable data transmission system. The electronic ticket could contain the corresponding ticket identification code and/or its machine-readable encoding. An electronic ticket received through a mobile application could also enable the mobile device to transmit the ticket identification code or an encrypted version thereof through a wireless data transmission standard, such as NFC, IEEE 802.11 (WiFi), Bluetooth, or Infrared Data Association (IrDA).

The master ticket database is preferably stored on a network-accessible server. The database may also be stored locally on a workstation computer. The database may be in the form of a comma separated value (.CSV) file, text file, spreadsheet or other suitable database format.

Ticket Authentication Device

Each ticket authentication device ("device") is operated by a gate or entry agent, or other staff member ("agent") to verify the authenticity and validity of a ticket presented for redemption. One or more devices may be operated during a single event to facilitate the volume of guests attending the event. A ticket authentication device may be a mobile device, such as a smartphone or tablet operating Apple iOS, Android, Windows, Blackberry, or other mobile operating system, further programmed to authenticate tickets through an installed software application. The mobile device is capable of reading-natively or through a hardware accessory-one or more of the machine-readable encoding technologies specifically utilized in the ticketing process. For example, most modern mobile devices are manufactured with a camera capable of reading many barcodes natively, but additional hardware accessories would be required to read data stored in RFID chips or magnetic strips.

In one embodiment, the device, through a hardware accessory, may also have the capability to write to the machine-readable encoding printed or installed on the tickets or create additional machine-readable encoding on the ticket.

Before the first use in a ticketed event, the ticket authentication device stores a local copy of the master ticket database. The device may access the database data through the network where the network-accessible server resides, through a mobile data network connection, or through a client workstation. For iOS devices, the database data may be accessed through the iTunes synchronization system.

Depending on the specific needs of the application, the local database stored on the device may be a full, partial or modified version of the master ticket database. At minimum, the local database would contain the ticket identification codes or the machine-readable encoding, allowing for an agent to verify that a ticket has a valid ticket identification code. The local database may include additional data, such as redemption status, to allow the agent to further verify that the ticket has not already been redeemed. The local database may include other additional data, such as the guests' personal information, to allow for agents to perform additional or alternative authentication steps as further discussed below.

The device may convert the local database to a different format, such as JSON, for more efficient storage and access by the device. JSON is a light-weight text-based open standard designed for human-readable data. It is the most widely used format for interchanging data on the web. It originates from the JavaScript language and is represented with two primary data structures: ordered lists (recognized as 'arrays') and name/value pairs (recognized as 'objects').

The device may be further programmed to require the agent to identify him or herself before operation. The device would store in memory the operating agent's identification data, which could include information such as the agent's name, employee number, or user name.

The device may be further programmed to require the agent to enter other information before operation, such as entry or gate location, venue or event name, which the device would store in memory.

Ticket Authentication

In one embodiment, when presented with a ticket, the agent uses the device to read the machine-readable encoding or encodings present on the ticket. The device is programmed to detect and read the detected encodings, and decode the corresponding ticket identification code. The device may also or alternatively be programmed to read the ticket identification code directly from the ticket through optical character recognition (OCR) technology. The device is further programmed to search for the retrieved ticket identification code in the list of known, valid ticket identification codes stored in the local ticket database and to retrieve the redemption status of the corresponding ticket stored in the local ticket database. If a positive search result is obtained, the device returns an authenticated status.

In another embodiment, the agent, using the device, may verify the identity of a guest by using "possession factors" based on something possessed by an authorized guest other than a ticket. For example, the device may be configured to read the MAC address and/or IMEI number of a mobile device carried by an individual. In another example, the device may be configured to read the magnetic stripe on a credit card carried by an individual, or the credit card information may be manually entered into the device by an agent. In yet another example, the device may be configured to scan a driver's license carried by an individual using the device's camera. The device would be programmed to retrieve the data from the license using OCR technology. In each of these examples, the device would be further programmed to search for the information retrieved from the individual's possession against the data stored in the local database to verify the guest's identity.

In another embodiment, the agent, using the device, may verify the identity of a guest by using "inherence factors" based on biometric identifiers. For example, the device may be configured to take a picture of an individual attempting access to an event and compare the picture with image of authorized guests stored in the local database using facial recognition technology. In another example, the device may be configured to read an individual's fingerprint and compare the scanned fingerprint against the fingerprint data of authorized guests stored in the local database.

More than one of the authentication methods discussed above may be employed by the device to verify the identity of a guest or validity of a ticket. The device may require a positive authentication using all employed methods before an authenticated status is returned to provide an enhanced level of security. The device may alternatively be programmed to return an authenticated status if at least one valid result is found to provide additional redundancy in the system at the cost of lesser security.

The device displays or otherwise conveys the result of the authentication process to the agent. If the ticket is found to be valid and unredeemed by the authentication process, the device may also or alternatively display a check-in screen. The screen may also display negative results from the authentication process, such as whether the ticket has already been redeemed, where it was redeemed and/or when it was redeemed; or if the ticket is otherwise invalid. The device could also instruct the agent to repeat the authentication steps if a negative result is reached. The check-in screen allows the agent to accept that the presented ticket is valid and designates the presented ticket redemption status as redeemed. The device may be programmed to update the redemption status of the accepted ticket in the local ticket database. The device may further be programmed store other information associated with the redemption of a ticket, including the redemption time and/or date, authentication device identification data, redeeming agent name or other identification data, and/or redemption gate location, event name and/or venue name. If a ticket identification code or a portion thereof is assigned to a group of tickets, the device maybe programmed to update the redemption count data associated with the ticket identification code upon checking in each guest carrying a ticket from the group.

In one embodiment, the device is configured to write data to the ticket. For example, if the ticket contains a magnetic strip or RFID chip, the device, through a hardware accessory, may write data to the ticket. This would allow the agent to make changes to the ticket on site, such as electronically "marking" a ticket as redeemed thereby eliminating the need for another device to query its local database for redemption status. This would be particularly useful in event venues where network or mobile data communication is unreliable.

Local Ticket Database Functions

The device may be further programmed to display all or a portion of the guest and/or ticket data that is stored in the local database. The data may be displayed after a ticket is scanned and would include some or all of the data associated with the scanned ticket. The device may be programmed to allow an agent to view or search part or all of the data stored in the local database at any time and without the need for scanning a ticket. The data may be displayed in a table format with sortable columns, or may be displayed in a simplified, summary-style format. In one embodiment, the agent can view the redemption status data for all the tickets stored in the local ticket database. This information may be useful to the agent to understand how many more valid and unredeemed tickets are left. In another embodiment, the agent can view the entire guest list stored in the local ticket database. This information may be useful to the agent before the start of the event to verify that local ticket database was created correctly or at the end of the event to view a final version of the guest list.

The displayed data may be used by the agent to further authenticate the ticket presenter as an authorized guest. In one embodiment, the locally stored and displayed data may include the guest's facial image that can be compared to the ticket presenter's face. In another embodiment, the locally stored and displayed data includes personal information associated with the authorized guest—such as birth date— that can be used as "knowledge factor" security questions by the agent for further authentication of the ticket presenter. The displayed data may also be used by the agent to provide additional customer service to the guest. In one embodiment, the stored and displayed data may include seating location that the agent can use to provide directions to the guest. In another embodiment, the device may be programmed to calculate directions based on seating locations stored in the local database. This can be used by the agent to provide further assistance to guests.

Other data may be displayed that highlight certain guests or groups of guests for specific treatment. For example, special security clearance may be granted to guests identified as law enforcement or security personnel. This information may be stored in the local database and displayed by the device upon scanning a ticket for these guests, which would alert the agent of the guests' special security clearance. The agent could use this information to allow these guests to bypass security, or provide other special access. Similar to the previous example, in another example, certain guests or groups of guests may be given special status, such as VIPs. This information could also be relayed to the agent upon scanning these tickets to alert the agent that the guest requires special treatment.

The device may be further programmed to allow for the agent to enter changes to part or all of the data stored in the local ticket database. The changes entered by the agent may either overwrite or only append the existing data in the local ticket database. The data that can be changed by an agent may be partially or fully restricted depending on the security level of the operating agent. In one embodiment, upon scanning an encoded ticket identification code, the device displays the name of the guest associated with the scanned ticket identification code. In this embodiment, the agent may ask the ticket presenter to verify the stored name associated with the presented ticket and make changes in the local ticket database to correct any discrepancies. In another embodiment, the agent's corrections and updates to the stored data are appended to the local ticket database in columns distinct from the original columns.

In another embodiment, the agent can assign or reassign seats at the time guests are checked in. In this embodiment, the agent has the ability to assign the best seats to the guests that check-in early and guests would be encouraged to arrive early. In this embodiment, the seat location data would be updated or appended in the local ticket database.

In another embodiment, the agent can make changes to part or all of the data stored in the local ticket database without scanning a ticket. In this embodiment, for example, the agent may view the personal data stored in the local ticket database and make corrections to the stored data.

Database Updates

The data stored in each device's local ticket database may be synchronized with the master ticket database during or at the end of the event. The scope of the data synchronized between the databases may be limited to certain data fields or data sets. The data may be synchronized through the data network where the network-accessible server resides, through a mobile data network connection, or through a client workstation. The data synchronization can occur manually at the command of an operating agent or by the command of a server or workstation user. The data synchronization may also be set to occur automatically at regular intervals or at any time data is stored or changed in any device.

In one embodiment, the devices are programmed to synchronize any changes to the ticket redemption data in the local ticket database after each guest is checked in. This ensures that the master ticket database contains the latest ticket redemption data at all times. This provides event staff with a powerful tool for understanding the event attendance rate in real time. In this same embodiment, the devices may be further programmed to receive a command to synchronize with the master ticket database whenever a change is made to the master ticket database. This ensures that the local ticket database stored on each of the devices contains the latest information. This would prevent tickets from being redeemed by multiple devices.

Other Functions

The ticket tracking system as described may also feature the ability to track the location of guests, or more specifically, their mobile devices and/or tickets, within a venue. This information may be useful to event staff in monitoring guest traffic volume, unauthorized access, or lost guests. This information may also be provided to guests to help locate facilities, seat locations, concessions, or to provide a general layout for the venue.

In one embodiment, the location of guests may be resolved passively by cameras and/or sensors installed in known locations throughout the venue. For example, these sensors can detect RFID chips or NFC tags within in the proximity that are associated with specific tickets. In another example, networked surveillance cameras are located in the event venue and the system compares images of individuals captured within the cameras' respective fields of view against the master ticket database using facial recognition technology.

In another embodiment, the location of guests may be resolved actively using mobile devices carried by guests. For example, a guest's mobile device is configured to detect the relative strengths of Wi-Fi signals transmitted by devices located throughout the venue. In another example, a guest's mobile device is configured to detect its location through its native GPS sensor. In both examples, the guest's mobile device communicates the resolved location data to the network-accessible server through a wireless network or mobile data connection.

The ticket tracking system as describe may also feature the ability for agents to communicate with other event staff through their devices. The communication feature could be accomplished by electronic mail or message, and/or voice. This feature would allow agents to convey information related to gate/entry status, such as security issues, equipment malfunctions, and guest traffic. It would also allow agents to request information, such as guest information, or event status. This feature could also allow other event staff to send communications to all or specific devices, providing a powerful tool for coordinating the efforts of agents.

In one embodiment, the device provides a direct line of communication with event management or security to convey security or safety issues encountered at a gate/entrance. Individuals attempting access or dissatisfied guests may require the attention of management and/or security staff. In this embodiment, a dedicated "panic button" on the device, which can be a physical "hard" or touch screen "soft" button, would allow an agent to quickly send a prepared or custom message to event management and/or security to direct their attention to their gate/entrance.

In any of the described embodiments, the user interface on the devices may be programmed to be customized according to the needs or preferences of the event staff or agent.

One or more network interfaces may the distribution of data between servers, workstations, and mobile devices. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What we claim is:

1. A networked system for tracking tickets comprising:
a mobile computing device comprising:
a programmed controlled input interface configured to scan a ticket identification code from a ticket presented by each ticket holder;
a non-transitory storage medium storing:
a list of ticket identification codes,
redemption status associated with each ticket identification code, the redemption status includes a threshold indicating a number of redemptions available and a redemption count for each ticket identification code assigned to a group of two or more tickets,
guest authentication information of each ticket holder associated with each ticket identification code of the group of two or more tickets,
additional data comprising at least one of biometric identifiers of each ticket holder and computer retrievable data from a ticket holder device to allow for alternative authentication steps, and data required to be entered before operation of the system by an operating agent, wherein the data comprises the operating agent's identification data;
a network communication component enabled to capture transmitted updates to the list of ticket identification codes stored on a remote server;
an output interface; and
a computer processor programmed to:
receive the scanned ticket identification code from the input interface,
determine if the scanned ticket identification code is valid by searching for the scanned ticket identification code in the list of ticket identification codes stored in the non-transitory stage medium,
display in the output interface a first negative result when the scanned ticket identification code is invalid, and a positive result when the scanned ticket identification code is valid,
determine if the scanned ticket identification code can be redeemed by checking its redemption status from the non-transitory storage medium, and by checking the redemption count with the threshold when the scanned ticket identification code is assigned to a group of two or more tickets,
display in the output interface a second negative result when the scanned ticket identification code cannot be redeemed, and a positive result when the scanned ticket identification code can be redeemed,
update the redemption status when the scanned ticket identification code can be redeemed, including incrementing the redemption count associated with the scanned ticket identification code when the scanned ticket identification code is assigned to a group of two or more tickets,
receive personal identifying information of each ticketholder of the scanned ticket identification code,
compare the received personal identifying information of each ticketholder with the guest authentication information associated with the scanned ticket identification code, and compare the additional data with data stored in the non-transitory storage medium,
update the guest authentication information stored in the non-transitory storage medium when the received personal identifying information of the ticketholder is not consistent with the stored guest authentication information,
send the updated guest authentication information to the remote server, and
synchronize information associated with the list of ticket identification codes stored in the non-transitory storage medium when a change is made in the remote server.

2. The tracking system of claim 1 wherein said remote server further comprises a ticket database that is updated in real time.

3. The tracking system of claim 1 wherein the input interface is comprised of a keyboard configured to receive manually entered data entry instructions.

4. The tracking system of claim 1 wherein the input interface is a digital camera and wherein the computer processor is further programmed to determine the ticket identification code from images captured by the digital camera.

5. The tracking system of claim 1 wherein the stored list of ticket identification codes further includes additional data associated with each ticket identification code.

6. The tracking system of claim 5 wherein the additional data is comprised of information for ticket authentication.

7. The tracking system of claim 1 wherein the network communication component further enabled to send changes to the list of ticket identification codes stored on the mobile computing device to the remote server.

* * * * *